United States Patent
Zhao et al.

(10) Patent No.: US 10,393,971 B2
(45) Date of Patent: Aug. 27, 2019

(54) PLUGGABLE OPTICAL MODULE

(71) Applicants: Hisense Broadband MultiMedia Technologies Co., Ltd, Shandong (CN); HISENSE USA CORP., Suwanee, GA (US); Hisense International Co., Ltd., Shandong (CN)

(72) Inventors: Wei Zhao, Shandong (CN); Hongchao Pan, Shandong (CN); Yinlong Liu, Shandong (CN); Wei Cui, Shandong (CN); Lin Yu, Shandong (CN)

(73) Assignees: Hisense Broadband Multimedia Technologies Co., Ltd., Shandong (CN); Hisense USA Corp., Suwanee, GA (US); Hisense International Co., Ltd., Shandong (CN)

( * ) Notice: Subject to any disclaimer, the term of this patent is extended or adjusted under 35 U.S.C. 154(b) by 0 days.

(21) Appl. No.: 15/229,764

(22) Filed: Aug. 5, 2016

(65) Prior Publication Data
US 2017/0160502 A1 Jun. 8, 2017

(30) Foreign Application Priority Data
Dec. 4, 2015 (CN) .......................... 2015 1 0894941

(51) Int. Cl.
*G02B 6/42* (2006.01)
*G02B 6/122* (2006.01)

(52) U.S. Cl.
CPC .......... *G02B 6/4277* (2013.01); *G02B 6/4261* (2013.01)

(58) Field of Classification Search
CPC .................................................. G02B 6/4277
See application file for complete search history.

(56) References Cited

U.S. PATENT DOCUMENTS

| 2008/0315528 | A1* | 12/2008 | Moore ................ G02B 6/4246 277/314 |
| 2009/0147493 | A1* | 6/2009 | Wu .................... H01R 13/6584 361/818 |
| 2009/0175582 | A1 | 7/2009 | Togami et al. |
| 2013/0142490 | A1 | 6/2013 | Teo et al. |
| 2014/0153192 | A1* | 6/2014 | Neer ................... G02B 6/4277 361/704 |

FOREIGN PATENT DOCUMENTS

| CN | 101669056 A | 3/2010 |
| CN | 101938061 A | 1/2011 |
| CN | 203708259 U | 7/2014 |
| CN | 205157852 U | 4/2016 |

OTHER PUBLICATIONS

Office Action Chinese Patent Application No. 201510894941.9 dated Sep. 13, 2016.

* cited by examiner

*Primary Examiner* — Sung H Pak
*Assistant Examiner* — Hoang Q Tran
(74) *Attorney, Agent, or Firm* — McDermott Will & Emery LLP

(57) ABSTRACT

Some embodiments of the present disclosure disclose a pluggable optical module, comprising a housing and an electromagnetic interference shielding clip clamped on the housing; a conductive member is provided between the housing and the electromagnetic interference shielding clip; and when the pluggable optical module is inserted into an optical module cage, the conductive member can block a gap between the housing and the electromagnetic interference shielding clip.

14 Claims, 5 Drawing Sheets

PLUGGABLE OPTICAL MODULE

CROSS-REFERENCE TO RELATED APPLICATIONS

The present application claims priority of Chinese Patent Application No. 201510894941.9, submitted to Chinese Patent Office on Dec. 4, 2015 and titled "PLUGGABLE OPTICAL MODULE", the disclosure of which is incorporated herein by reference in its entirety.

FIELD

The present disclosure relates to the technical field of optical modules, and in particular to a pluggable optical module.

BACKGROUND

In optical fiber communication technologies, optical signals, as carriers for information, perform high-speed, long-time and reliable information transmission. The function of optical modules is photovoltaic conversion. That is, a sending terminal converts an electric signal to an optical signal; and after transferring the optical signal by an optical fiber, a receiving terminal converts the optical signal to the electric signal again.

SUMMARY

Some embodiments of the present disclosure provide a pluggable optical module, including a housing and an electromagnetic interference shielding clip clamped on the housing; a conductive member is provided between the housing and the electromagnetic interference shielding clip; and when the pluggable optical module is inserted into the optical module cage, the conductive member can block a gap between the housing and the electromagnetic interference shielding clip.

BRIEF DESCRIPTION OF THE DRAWINGS

In order to describe technical solutions in some embodiments of the present disclosure more clearly, the accompanying drawings to be used in the description of some embodiments will be introduced briefly below. Obviously, the accompanying drawings in the description below are merely some embodiments of the present disclosure. For a person of ordinary skill in the art, other accompanying drawings can be obtained according to these accompanying drawings without paying any creative effort.

DETAILED DESCRIPTION

The accompanying drawings in some embodiments of the present disclosure are incorporated to describe the technical solutions in some embodiments of the present disclosure below. Obviously, the embodiments described are merely some but not all embodiments of the present disclosure. On the basis of the embodiments of the present disclosure, all other embodiments obtained by a person of ordinary skill in the art without paying any creative effort shall fall into the protection scope of the present disclosure.

In the description of the present disclosure, it should be noted that, the orientation or location relation indicated by terms such as "center", "up", "below", "front", "back", "left", "right", "vertical", "horizontal", "top", "bottom", "internal", "external" and the like is an orientation or location relation based on what is shown in the accompanying drawings, and is merely used for conveniently describing the present disclosure and simplifying the description, instead of indicating or implying that the involved devices or elements must have a specific orientation, and must be constructed and operated in a specific orientation. Therefore, these terms shall not be regarded as limitations to the present disclosure.

In the description of the present disclosure, unless otherwise specified, "a plurality of" means two or more.

Figure 1:
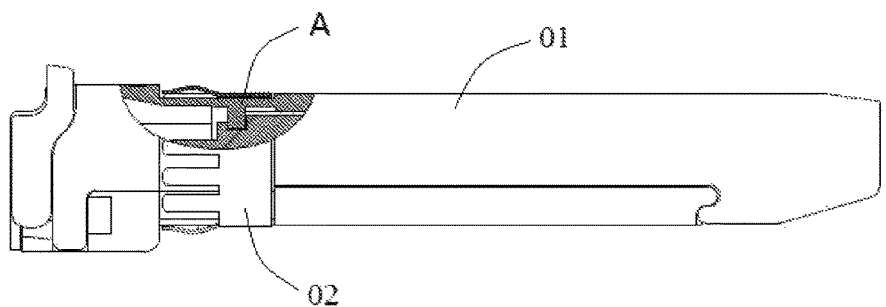
FIG. 1 is a partial section view of a pluggable optical module in the related art.
Figure 2:
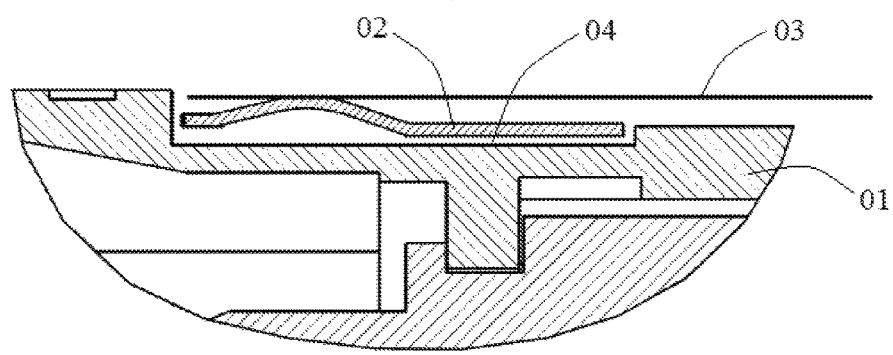
FIG. 2 is an enlarged view of portion A of FIG. 1.

FIG. 1 is a partial section view of a pluggable optical module in the prior art. FIG. 2 is an enlarged view of portion A of FIG. 1. The pluggable optical module includes a housing 01 and an electromagnetic interference shielding clip 02 clamped on the housing 01; and when the pluggable optical module is inserted into a optical module cage 03, the electromagnetic interference shielding clip 02 is located between an external surface of the housing 01 and an internal surface of the optical module cage 03, so as to prevent the electromagnetic waves inside the optical module cage 03 from leaking between the external surface of the housing 01 and the internal surface of the optical module cage 03. In the pluggable optical module in the prior art, the electromagnetic interference shielding clip 02 is in a surface contact with the housing 01. Restricted by process precision, the internal surface of the electromagnetic interference shielding clip 02 cannot be fully fitted to the external surface of the housing 01, leading to a gap 04 between the electromagnetic interference shielding clip 02 and the housing 01. Electromagnetic waves inside the optical module cage 03 will leak to the outside of the optical module cage 03 by the gap 04, causing interference to other surrounding electronic devices.

FIGS. 3 to 7 show some embodiments of the pluggable optical module of the present disclosure. The pluggable optical module in some embodiments of the present disclosure includes a housing 1 and an electromagnetic interference shielding clip 2 clamped on the housing 1; a conductive member 3 is provided between the housing 1 and the electromagnetic interference shielding clip 2; and when the pluggable optical module is inserted into an optical module cage 4, the conductive member 3 can block a gap 5 between the housing 1 and the electromagnetic interference shielding clip 2.

The conductive member 3 is a conductive component. For example, the conductive member 3 can be a conductive net, a conductive foam or conductive rubber and the like. The conductive member 3 is not limited in the embodiments of the present disclosure.

With regard to the pluggable optical module provided in the foregoing embodiments of the present disclosure, since the conductive member 3 is provided between the housing 1 and the electromagnetic interference shielding clip 2, when the pluggable optical module is inserted into the optical module cage 4, the conductive member 3 can block the gap 5 between the housing 1 and the electromagnetic interference shielding clip 2 so as to prevent the electromagnetic waves inside the optical module cage 4 from leaking from the gap 5 between the electromagnetic interference shielding clip 2 and the housing 1. In this way, the electromagnetic wave radiation may be reduced, and thus interference to other surrounding electronic devices may be avoided.

In some embodiments of the present disclosure, the conductive member 3 is elastic. That is, the conductive member 3 can be deformed when compressed. In this way, the conductive member 3 can be set to have a relatively great thickness. When the electromagnetic interference shielding clip 2 is clamped on the housing 1, the conductive member 3 is compressed by the electromagnetic interference shielding clip 2, so that the conductive member 3 can better block the gap between the housing 1 and the electromagnetic interference shielding clip 2. In addition, since the conductive member 3 is elastic to some extent, it is easier to clamp the electromagnetic interference shielding clip 2 on the housing 1.

Figure 3:
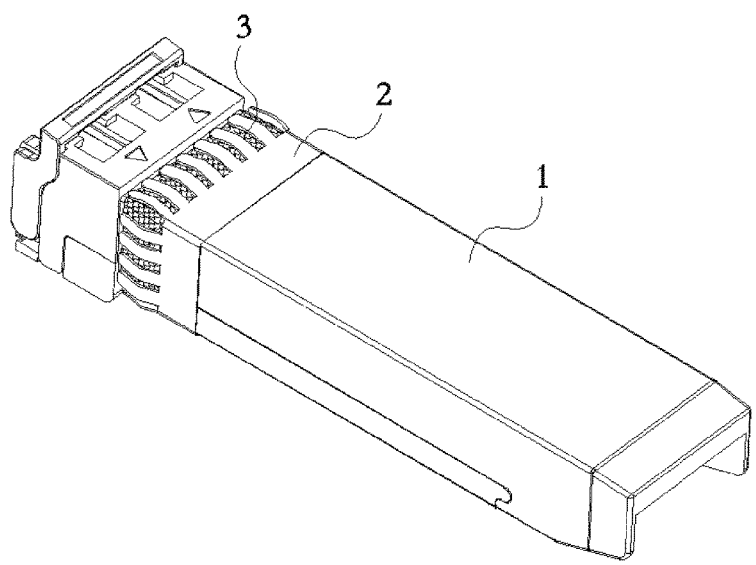
FIG. 3 is a schematic view of a pluggable optical module according to some embodiments of the present disclosure.
Figure 4:
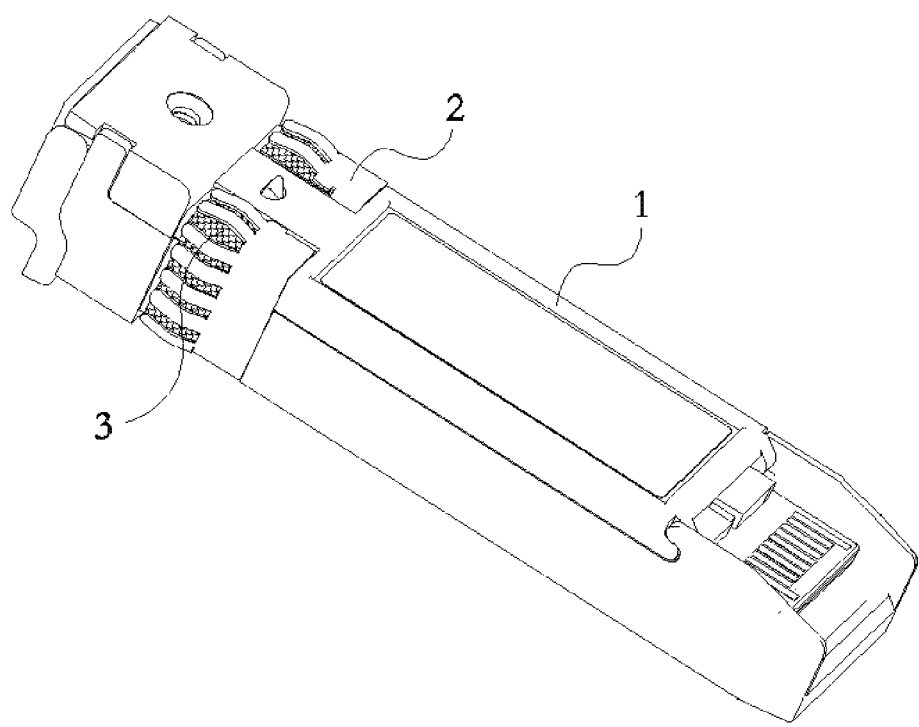
FIG. 4 is a schematic view, from another angle, of the pluggable optical module according to some embodiments of the present disclosure.
Figure 5:
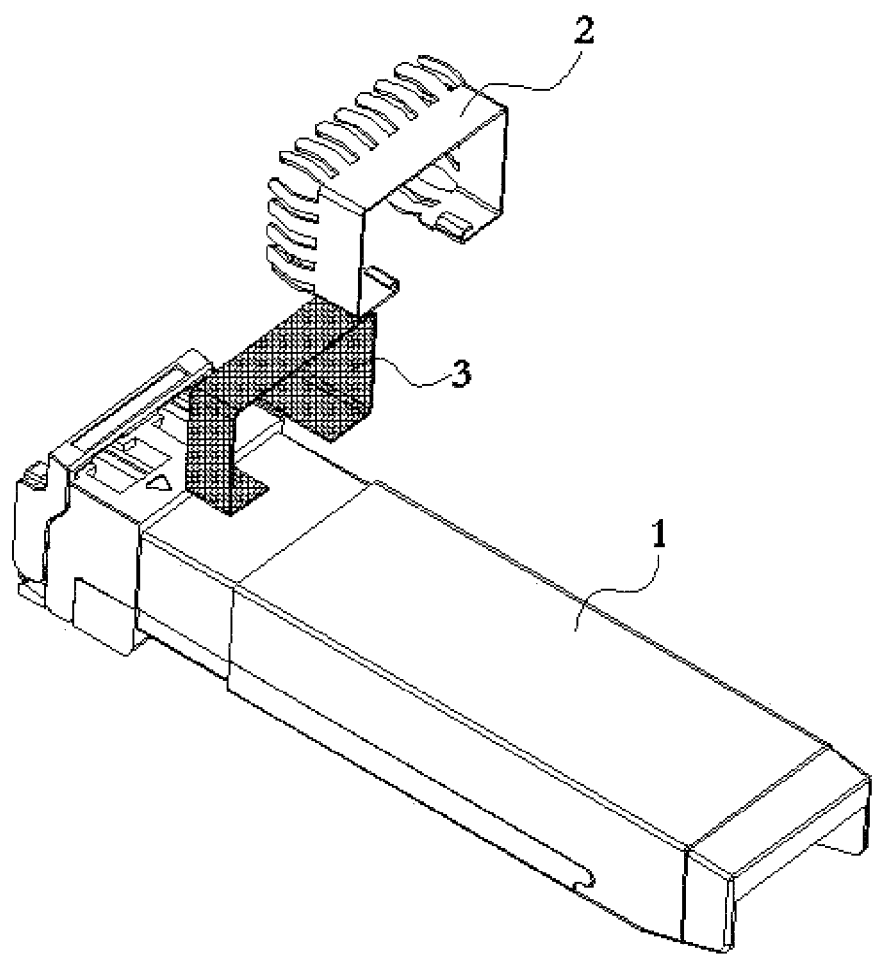
FIG. 5 is an exploded view of FIG. 3.
Figure 6:
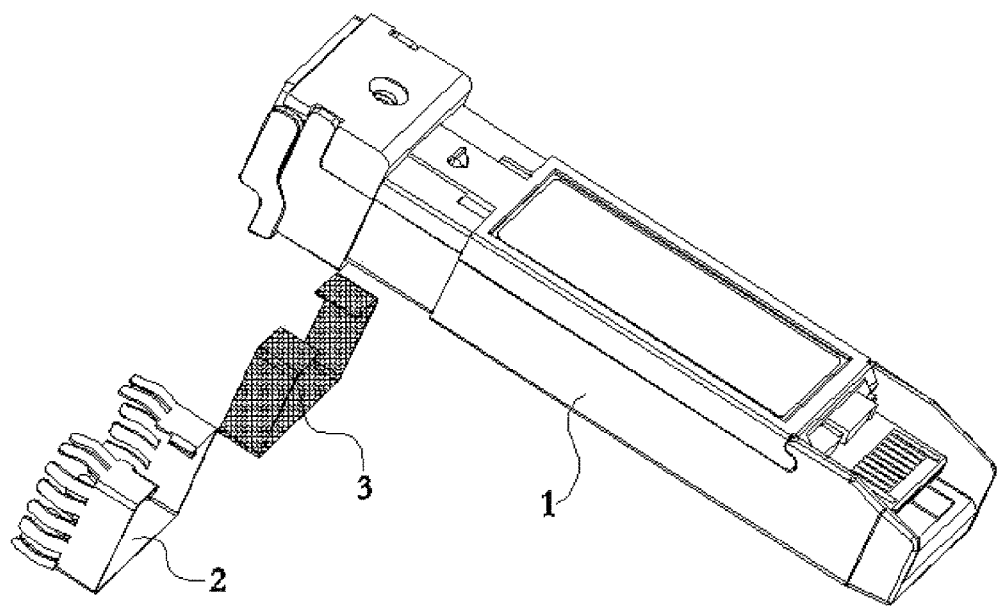
FIG. 6 is an exploded view of FIG. 4.
Figure 7:
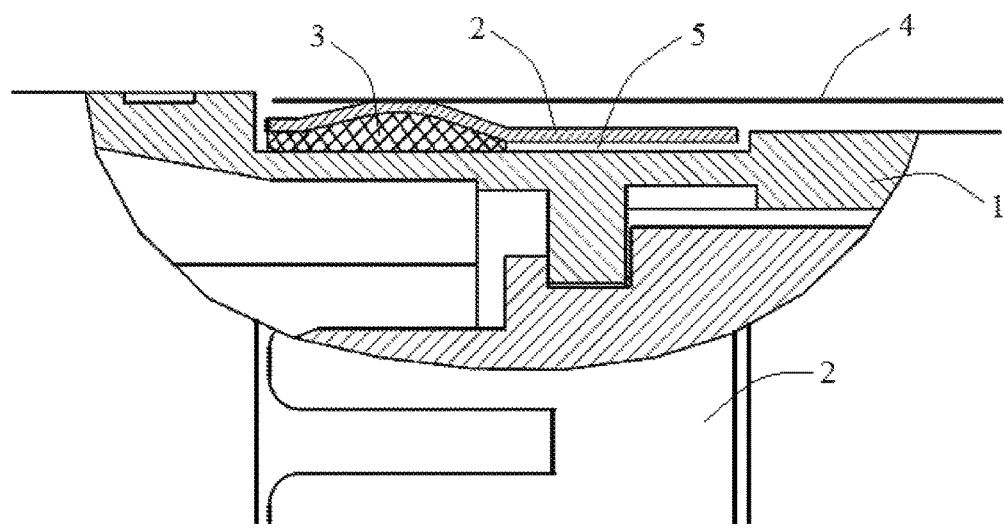
FIG. 7 is a partial section view of FIG. 3.

In order to prevent the conductive member 3 from disturbing insertion of the pluggable optical module into the optical module cage 4 or pulling of the pluggable optical module out from the inside of the optical module cage 4, with reference to FIGS. 3 and 4, the electromagnetic interference shielding clip 2 in some embodiments covers the conductive member 3. In this way, part of the conductive member 3 can be prevented from being exposed between the housing 1 and the electromagnetic interference shielding clip 2, and further the exposed part of the conductive member 3 is prevented from disturbing insertion of the pluggable optical module into the optical module cage 4 or pulling of the pluggable optical module out from the inside of the optical module cage 4.

Figure 8:
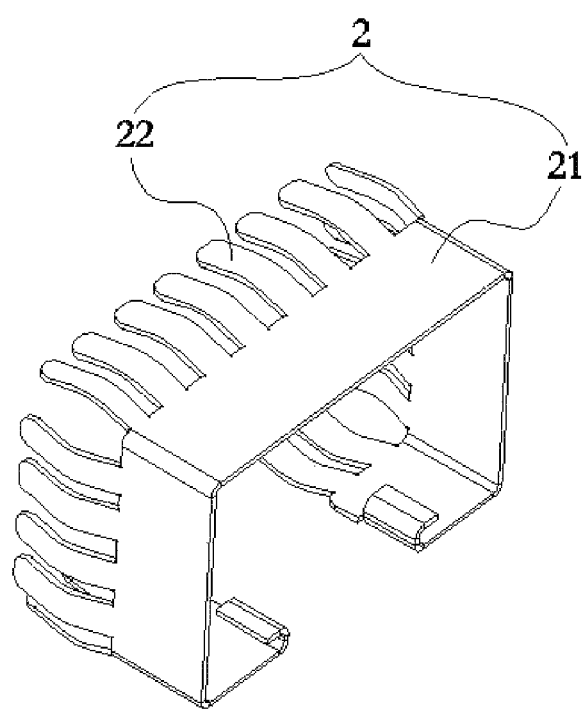
FIG. 8 is a schematic view of an electromagnetic interference shielding clip in a pluggable optical module according to some embodiments of the present disclosure.

In some embodiments of the present disclosure, with reference to FIG. 8, the electromagnetic interference shielding clip 2 includes a C-shaped metal sheet 21, and a plurality of elastic metal sheets 22 fixed on one side edge of the C-shaped metal sheet 21. The plurality of elastic metal sheets 22 can be arranged unevenly, and can also be arranged evenly. In some embodiments, the plurality of elastic metal sheets 22 are arranged evenly. When the pluggable optical module is inserted into the optical module cage 4, firstly, the C-shaped metal sheet 21 enters into the optical module cage 4 from an opening of the optical module cage 4; then, the plurality of elastic metal sheets 22 reach the opening of the optical module cage 4; and in this case, compressed by the internal surface of the optical module cage 4, the plurality of elastic metal sheets 22 are elastically deformed, so as to block the gaps between the housing 1 and the optical module cage 4 and prevent the electromagnetic waves inside the optical module cage 4 from leaking between the housing 1 and the optical module cage 4.

The conductive member 3 can have a length greater than, less than or equal to a developed length of the C-shaped metal sheet 21. When the conductive member 3 has a length greater than a developed length of the C-shaped metal sheet 21, part of the conductive member 3 is likely to be exposed between the housing 1 and the electromagnetic interference shielding clip 2. As a result, the insertion and pulling-out of the pluggable optical module may be influenced, and the cost of the pluggable optical module may also be increased. In order to avoid those problems, the conductive member 3 in some embodiments has a length less than or equal to the developed length of the C-shaped metal sheet 21. In this way, the conductive member 3 can be completely arranged between the electromagnetic interference shielding clip 2 and the housing 1. Thus, influence on the insertion and pulling-out of the pluggable optical module may be avoided, and the cost may also be saved.

On the basis of the foregoing embodiments, the conductive member 3 in some embodiments has a length equal to the developed length of the C-shaped metal sheet 21. In this way, not only the cost may be saved, but also the gap 5 between the electromagnetic interference shielding clip 2 and the housing 1 may be completely blocked by the conductive member 3 to prevent the electromagnetic waves from leaking.

In order to prevent the electromagnetic waves inside the optical module cage 4 from leaking and save the cost, in some embodiments of the present disclosure, the conductive member 3 has a width less than or equal to a length of the elastic metal sheet 22. In this case, the conductive member 3 can be arranged between the elastic metal sheets 22 and the housing 1. Since the elastic metal sheets 22 are often clamped at the opening of the optical module cage 4, by providing the conductive member 3 between the elastic metal sheet 22 and the housing 1, not only the electromagnetic waves inside the optical module cage 4 may be prevented from leaking from the opening of the optical module cage 4, but also the cost may be reduced.

In some embodiments of the present disclosure, the conductive member 3 has a compressed thickness less than or equal to the shortest one of distances from the plurality of elastic metal sheets 22 to the housing 1. In this way, it can be ensured that after the conductive member 3 is provided on the housing 1, the electromagnetic interference shielding clip 2 may be clamped on the housing 1 smoothly and that the pluggable optical module clamped with the electromagnetic interference shielding clip 2 may be inserted into the optical module cage 4 smoothly.

In some embodiments of the present disclosure, the conductive member 3 is a conductive net. The conductive net can be a net formed of conductors, and can also be a net formed of both conductors and non-conductors. The conductive net is not limited in the embodiments of the present disclosure. The conductive net exhibits excellent conductivity and shielding performance, and may therefore better shield the electromagnetic waves inside the optical module cage 4.

In some embodiments of the present disclosure, the conductive member 3 is a conductive foam with good elasticity. When the conductive foam is mounted on the housing 1 and then the electromagnetic interference shielding clip 2 is mounted, the conductive foam is highly compressed. In this way, the mounting of the electromagnetic interference shielding clip 2 may be free from inconvenience.

In some embodiments of the present disclosure, the conductive member 3 is conductive rubber. The conductive rubber not only has excellent conductivity and shielding performance, but also is aging-resistant, easy to form and stable, thus prolonging the service life of the pluggable optical module.

In some embodiments of the present disclosure, the conductive member 3 is attached to the housing 1 by a conductive adhesive. The conductive adhesive not only exhibits excellent conductivity, but also can connect various kinds of material of a same or different type to each other. The conductive adhesive can simplify the processing process due to less restriction on material, good adhesion and convenient operation.

The foregoing descriptions are merely some embodiments of the present disclosure. However, the protection scope of the present disclosure is not limited thereto. Any changes or replacements made by those skilled in the art within the technical scope disclosed by the present disclosure should fall into the protection scope of the present disclosure. Therefore, the protection scope of the present disclosure shall be subject to the protection scope of the claims.

What is claimed is:

1. A pluggable optical module, comprising:
a housing and an electromagnetic interference shielding clip clamped on the housing, and
a conductive member provided between the housing and the electromagnetic interference shielding clip,
wherein, when the pluggable optical module is inserted into an optical module cage, the conductive member can block a gap between the housing and the electromagnetic interference shielding clip,
wherein the electromagnetic interference shielding clip comprises a C-shaped metal sheet and a plurality of elastic metal sheets fixed on one side edge of the C-shaped metal sheet, the C-shaped metal sheet has an opening between two ends of the C-shaped metal sheet, and the two ends of the C-shaped metal sheet are folded inward to form U-shaped edges;
wherein the housing has a protruded portion having two sides opposite each other in which one side contacts one end of the C-shaped metal sheet and the other side contacts the other end of the C-shaped metal sheet, so that the protruded portion is inserted through the opening of the C-shaped metal sheet and the U-shaped edges of the two ends of the C-shaped metal sheet are respectively clamped on two sides of the protruded portion,
the U-shaped edges fit inside indentations formed in the housing adjacent to the protrusion so as to latch the C-shaped metal sheet into contact with the protrusion, and
the conductive member has a length less than or equal to a developed length of the C-shaped metal sheet except for a length of the U-shaped edges, in order to allow ends of the conductive member respectively to make contact with the two sides of the protruded portion.

2. The pluggable optical module according to claim 1, wherein the conductive member is elastic.

3. The pluggable optical module according to claim 2, wherein the elastic conductive member has a thickness set to be greater than that of an inelastic conductive member.

4. The pluggable optical module according to claim 2, wherein the electromagnetic interference shielding clip covers the conductive member.

5. The pluggable optical module according to claim 2, wherein the conductive member is a conductive net.

6. The pluggable optical module according to claim 5, wherein the conductive net is a net formed of conductors.

7. The pluggable optical module according to claim 5, wherein the conductive net is a net formed of both conductors and non-conductors.

8. The pluggable optical module according to claim 2, wherein the conductive member is a conductive foam.

9. The pluggable optical module according to claim 2, wherein the conductive member is conductive rubber.

10. The pluggable optical module according to claim 1, wherein the plurality of elastic metal sheets are arranged evenly.

11. The pluggable optical module according to claim 1, wherein the conductive member has a width less than or equal to a length of the elastic metal sheets.

12. The pluggable optical module according to claim 11, wherein the elastic metal sheets are clamped at an opening of the optical module cage, and the conductive member is provided between the elastic metal sheets and the housing.

13. The pluggable optical module according to claim 1, wherein the conductive member has a compressed thickness less than or equal to the shortest one of distances from the plurality of elastic metal sheets to the housing.

14. The pluggable optical module according to claim 1, wherein the conductive member is attached to the housing by a conductive adhesive.

* * * * *